Patented May 2, 1939

2,156,344

UNITED STATES PATENT OFFICE 2,156,344

CONCENTRATION OF ALIPHATIC COMPOUNDS

Herbert E. Martin, Cumberland, Md., assignor to Celanese Corporation of America, a corporation of Delaware No Drawing. Application November 14, 1936, Serial No. 110,881

17 Claims. (Cl. 260—541)

This invention relates to improvements in the manufacture of concentrated lower aliphatic acids from their solutions and particularly their dilute solutions of whatever origin, and particularly to the manufacture of concentrated acetic acid from crude pyroligneous acid, from dilute acetic acid obtained as a by-product in the acetylation of cellulose, from fermentation acid, etc.

An object of the invention is to provide an economical process for extracting the lower aliphatic acids from relatively dilute solutions of the same by means of an extracting medium. Another object of the invention is to provide a process for extracting lower aliphatic acids from aqueous solutions of the same by the use of an extracting medium containing an ester of a lower fatty acid, in which process hydrolysis of the ester is inhibited. A still further object of this invention is the concentration of acids from dilute aqueous solutions of the same in an apparatus which is not corroded by the chemicals employed and which does not impart to the recovered acid or the extracting medium undesired color and depreciated value. Other objects of the invention will appear from the following detailed description.

It is known that acetic acid may be extracted from dilute aqueous solutions of the same with the aid of liquids which are insoluble or relatively insoluble in water such as, for example, a mixture of ethyl acetate and benzene. When extracting acetic acid from its aqueous solution with such a mixture, it is found that the ethyl acetate saponifies or hydrolyzes, liberating ethyl alcohol which is carried away in the effluent water. I have found that if certain other compounds are added, either to the extracting medium or to the dilute aqueous solutions of the acids, the hydrolysis of the ethyl acetate is inhibited to such an extent that the depletion of the same is negligible for practical industrial purposes.

In accordance with this invention, I extract aliphatic acids from aqueous solutions containing the same by means of an extracting medium, which extracting medium contains ethyl acetate and/or another ester of a lower fatty acid, in the presence of a compound which inhibits the hydrolysis of the ester contained in the extracting medium under the conditions existing in the extracting process. The preferred extracting medium for concentrating acetic acid is a mixture containing, besides the inhibitor compound, from 70 to 80 parts by volume of ethyl acetate and from 30 to 20 parts by volume of benzene.

Also in accordance with this invention, I extract aliphatic acids from aqueous solutions containing the same by employing extracting apparatus at least a part of which is formed of or coated with a urea-formaldehyde resin.

As stated above, the preferred extracting medium contains besides the inhibitor compound from 70 to 80 parts by volume of ethyl acetate and 30 to 20 parts by volume of benzene. When the higher percentage of ethyl acetate is employed less acid remains in the water tailings, while the acid content of the extraction mixture employing the lower percentage of ethyl acetate is approximately 18% higher than when the higher percentage of ethyl acetate is employed. This means that from each volume of extractant there is obtained 18% more acid when employing the mixture of 70 parts ethyl acetate and 30 parts benzene than when employing 80 parts ethyl acetate and 20 parts benzene. On the other hand, there is left in the water about 300% more acid when using the 70/30 mixture than when using the 80/20 mixture, i. e., about .0139% of acid is found in the tailings or effluent water where the 70/30 mixture is employed, while about 0.13% of acid is found in the tailings or effluent water where the mixture is employed, all other factors such as size of extracting column, temperature, etc., remaining constant. From the above it will be appreciated that the amount of the components of the extracting medium should be maintained at a fairly constant ratio. This regulation of the ratio of the components becomes very difficult due to the hydrolysis of the ethyl acetate under the conditions of the extracting process. As the extracting medium is continually re-cycled through the system and the ethyl acetate component is continually being broken down, there is built up in the system too great a ratio of benzene to the ethyl acetate. For economical reasons the ethyl acetate containing from 2 to 5% benzene as a denaturant therefor is purchased. The mixture of ethyl acetate and benzene is not readily separated into its components and, therefore, the addition of the denatured ethyl acetate to the system continually builds up the benzene component while the ethyl acetate component is continually reduced by hydrolysis. In time this would create the necessity for a great storage capacity for the extracting medium or the necessity of setting up an auxiliary apparatus to treat the extracting medium to maintain the proper ratio of the components. It is therefore necessary for the economic carrying out of the process to employ a medium which will inhibit the hydrolysis of the ethyl acetate or other ester.

The use of any suitable inhibitor against the hydrolysis of the ethyl acetate or other ester employed in the extracting medium is within the scope of this invention. I have found very effective inhibitors to be sodium acetate, potassium acetate, sodium sulphate, potassium sulphate and the like compounds. These inhibitors may be dissolved in water and added to the dilute aqueous solution of aliphatic acid entering the system or the inhibitors may be added to the extracting medium entering the system. Although the sodium and potassium salts which have been mentioned are the preferred inhibitors, other alkaline metal salts may be employed. It is obvious that if carbonates or bicarbonates are added they will be changed to the acetate or sulphate if sulphuric acid be also present in the aqueous acetic acid which salts, as stated above are the desired inhibitors. The amount of alkali metal salt employed as the inhibitor may vary from 0.05 to 4% of a concentrated aqueous solution of the same, the quantity being based on the amount of dilute aqueous acid entering the system.

A trace or more of sulphuric acid in the dilute solution from which the acid is to be concentrated increases the hydrolysis of ethyl acetate. Therefore, if the dilute acetic acid contains any sulphuric acid, which is often the case when the dilute acid is received from processes involving the acetylation of cellulose, the sulphuric acid should be neutralized with sodium carbonate or sodium acetate prior to entering into the extracting system. As stated above sodium sulphate is an excellent inhibitor against hydrolysis of the ethyl acetate. Therefore, if a trace of sulphuric acid is present the same is neutralized by sodium carbonate or sodium acetate, forming sodium sulphate in situ, due to the reaction of the sulphuric acid.

After extraction of the acid from the aqueous solution containing the same with the extractant mixture of ethyl acetate, benzene and inhibitor, the acid may be recovered from the extractant by fractional distillation or in any other suitable manner. The inhibitor for the most part will pass out of the system with the effluent water. The mixture of ethyl acetate and benzene in the range of proportions stated above is exceptionally well suited to the recovery of the acid by fractional distillation as there is a great difference between the boiling points of the acid and the constant boiling point mixture of ethyl acetate and benzene.

This invention is applicable to the separation of aliphatic acid from any aqueous solution of the same. By aliphatic acid is meant formic, acetic, butyric, propionic and other members of the series. This invention has been described with particular reference to the recovery of concentrated acetic acid from aqueous solutions of said acid derived from the pretreatment of cellulose and acetylation of cellulose and the manufacture of cellulose acetate and products containing the same. It is understood, however, that the invention is not limited to dilute acid received from such a source. Other sources of the dilute acid may be the aqueous aliphatic acid solutions such as crude pyroligneous acid obtained by the destructive distillation of wood or other vegetable matter, liquors obtained from the fermentation of acid from apples, grapes or other vegetable matter, the destructive distillation of aliphatic acid salts, etc.

The extraction may be carried out in any known manner; it is preferably carried out, however, in a plant or device fully described in U. S. application S. No. 747,083, filed October 5, 1934. In this device the extractant and dilute aqueous acid enter at opposite ends of a column or series of columns and flow counter-current to each other. The columns, insofar as this invention is concerned, may be empty and a turbulent flow created or they may be partially or wholly filled with surface forming materials such as Raschig rings, broken stone or earthenware, beads or balls, etc. The stripped water is withdrawn from the system, still containing a fraction of a percent of acid and the major part of the inhibitor, while the extractant, containing from about 10% to 25% of acid, depending upon the proportions of ethyl acetate and benzene employed, is withdrawn from the system to a still or other separate system.

Although any extracting device as described above may be employed, I may also employ a device the column of which consists of a series of baffle plates and spray nozzles at top and bottom for the injection into the column of both the extractant and the dilute acids. I prefer to form the spray nozzles especially, and in some circumstances the spray nozzles and the baffle plates, of a urea-formaldehyde resin. The urea-formaldehyde resin may be secured as a powder and press molded into the desired shape. By using these parts formed of urea-formaldehyde resin in preference to metal parts, there is eliminated from the system the possibility of the acid corroding these parts, reducing their efficiency and throwing into the system metallic salts which may be carried into the concentrated aliphatic acid, giving to the same an off-color and other undesirable properties.

Other methods of carrying out the extraction may be employed. For instance, it may be carried out as a batch process wherein a dilute acid with the inhibitor and the extracting medium are introduced into the tank, thoroughly mixed and then permitted to separate into layers which are separately drawn off. For further efficiency, it is better to carry out the batch extraction in a series of tanks in a methodical manner, i. e. the first tank is fed with fresh extraction medium and dilute acid containing the inhibitor that has been subjected to a previous extraction treatment, while the last tank is fed with fresh dilute acid, the inhibitor and the extracting medium that has been used for former extractions and is, therefore, charged with acid.

The extraction medium and dilute aqueous acid are preferably put together at a temperature between 20° and 30° C., for instance at 24° or 25° C. When extracting acetic acid the acid may be separated from the extraction medium by distillation in a still at a temperature of about 120° C. to 125° C., with a temperature of from 90° C. to 72° C. in the reflux column. The trace of alkali metal salt carried into the still prevents to a great extent the hydrolysis of the ester component of the extracting medium.

In order to further illustrate this invention without being limited thereby, the following example is given:

*Example*

A dilute aqueous acetic acid of about 31% strength has mixed therewith about 1% by volume of a concentrated aqueous solution of sodium sulphate. This mixture is run counter-current, through a series of columns partially filled with Raschig rings, to a stream of the extracting medium comprising 80% ethyl acetate and 20% benzene. The temperature is maintained at about 25° C. The extracting medium with its extracted acid is passed to a still where the acid is distilled from the extracting medium. A sample of the effluent water shows but a trace of ethyl alcohol.

It is to be understood that the foregoing detailed description is given merely by way of illustration and that many variations may be made therein without departing from the spirit of my invention.

Having described my invention, what I desire to secure by Letters Patent is:

1. Process for the concentration of an aqueous solution of a fatty acid, which comprises extracting the acid from the aqueous solution with an extracting medium containing a fatty acid ester of an alcohol in the presence of a small proportion of a salt of an alkali metal.

2. Process for the concentration of an aqueous solution of a lower fatty acid, which comprises extracting the acid from the aqueous solution with an extracting medium containing a fatty acid ester of an alcohol in the presence of a small proportion of a salt of an alkali metal.

3. Process for the concentration of an aqueous solution of acetic acid, which comprises extracting the acid from the aqueous solution with an extracting medium containing a fatty acid ester of an alcohol in the presence of a small proportion of a salt of an alkali metal.

4. Process for the concentration of an aqueous solution of a fatty acid, which comprises extracting the acid from the aqueous solution with an extracting medium containing ethyl acetate in the presence of a small proportion of a salt of an alkali metal.

5. Process for the concentration of an aqueous solution of acetic acid, which comprises extracting the acid from the aqueous solution with an extracting medium containing ethyl acetate in the presence of a small proportion of a salt of an alkali metal.

6. Process for the concentration of an aqueous solution of acetic acid, which comprises extracting the acid from the aqueous solution with an extracting medium containing ethyl acetate in the presence of a small proportion of an alkali sulphate.

7. Process for the concentration of an aqueous solution of acetic acid, which comprises extracting the acid from the aqueous solution with an extracting medium containing ethyl acetate in the presence of a small proportion of an alkali acetate.

8. Process for the concentration of an aqueous solution of a fatty acid, which comprises extracting the acid from the aqueous solution with an extracting medium containing a fatty acid ester of an alcohol in the presence of a salt of an alkali metal in amount equivalent to that contained in up to 4%, based on the weight of the acid solution, of a concentrated aqueous solution of the salt.

9. Process for the concentration of an aqueous solution of a fatty acid, which comprises extracting the acid from the aqueous solution with an extracting medium containing ethyl acetate and benzene in the presence of a small proportion of a salt of an alkali metal.

10. Process for the concentration of an aqueous solution of acetic acid, which comprises extracting the acid from the aqueous solution with an extracting medium containing ethyl acetate and benzene in the presence of a small proportion of an alkali sulphate.

11. Process for the concentration of an aqueous solution of acetic acid, which comprises extracting the acid from the aqueous solution with an extracting medium containing ethyl acetate and benzene in the presence of a small proportion of an alkali acetate.

12. Process for the concentration of an aqueous solution of a fatty acid, which comprises extracting the acid from the aqueous solution with an extracting medium containing from 70–80 parts of ethyl acetate and from 30–20 parts of benzene in the presence of a small proportion of a salt of an alkali metal.

13. Process for the concentration of an aqueous solution of a fatty acid, which comprises extracting the acid from the aqueous solution with an extracting medium containing from 70–80 parts of ethyl acetate and from 30–20 parts of benzene in the presence of a salt of an alkali metal in amount equivalent to that contained in up to 4%, based on the weight of the acid solution, of a concentrated aqueous solution of the salt.

14. Process for the concentration of an aqueous solution of a fatty acid which contains sulphuric acid, which comprises neutralizing the sulphuric acid to form a sulphate of an alkali metal and extracting the aqueous solution with an extracting medium containing ethyl acetate in the presence of the products formed in the neutralization of the sulphuric acid.

15. Process for the concentration of an aqueous solution of acetic acid which contains sulphuric acid, which comprises neutralizing the sulphuric acid to form a sulphate of an alkali metal and extracting the aqueous solution with an extracting medium containing ethyl acetate in the presence of the products formed in the neutralization of the sulphuric acid.

16. Process for the concentration of an aqueous solution of acetic acid which contains sulphuric acid, which comprises neutralizing the sulphuric acid to form a sulphate of an alkali metal and extracting the aqueous solution with an extracting medium containing ethyl acetate and benzene in the presence of the products formed in the neutralization of the sulphuric acid.

17. An extracting medium for use in extracting fatty acids from aqueous solutions containing the same, which comprises a mixture of ethyl acetate, benzene and a small proportion of a salt of an alkali metal.

HERBERT E. MARTIN.